(12) United States Patent
Bussear et al.

(10) Patent No.: US 6,615,917 B2
(45) Date of Patent: Sep. 9, 2003

(54) COMPUTER CONTROLLED INJECTION WELLS

(75) Inventors: Terry R. Bussear, Friendwoods, TX (US); Kevin R. Jones, Atascocita, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/947,118

(22) Filed: Sep. 5, 2001

(65) Prior Publication Data

US 2002/0027004 A1 Mar. 7, 2002

Related U.S. Application Data

(63) Continuation of application No. 09/462,334, filed on Apr. 4, 2000
(60) Provisional application No. 60/052,042, filed on Jul. 9, 1997.

(51) Int. Cl.$^7$ ................................................ E21B 34/06
(52) U.S. Cl. .......................... 166/250.15; 166/252.1; 166/53
(58) Field of Search ................ 160/250.15, 303, 160/53, 272.1, 250.01, 252.1

(56) References Cited

U.S. PATENT DOCUMENTS

| 2,658,724 | A | | 11/1953 | Arps |
| 3,018,828 | A | | 1/1962 | Prentiss |
| 4,611,664 | A | | 9/1986 | Osterhoudt, III et al. |
| 4,770,243 | A | | 9/1988 | Fouillout et al. |
| 4,805,450 | A | | 2/1989 | Bennett et al. |
| 5,047,632 | A | | 9/1991 | Hunt |
| 5,273,113 | A | | 12/1993 | Schultz |
| 5,635,712 | A | | 6/1997 | Scott, III et al. |
| 5,662,165 | A | | 9/1997 | Tubel et al. |
| 6,281,489 | B1 | * | 8/2001 | Tubel et al. ........... 250/227.14 |

FOREIGN PATENT DOCUMENTS

| GB | 2 123 062 | 6/1983 |
| GB | 2 309 471 | 1/1997 |
| WO | WO 97/49894 | 6/1997 |

* cited by examiner

Primary Examiner—William Neuder
(74) Attorney, Agent, or Firm—Cantor Colburn LLP

(57) ABSTRACT

Methods and apparatus are disclosed for controlling and monitoring injection zone and production zone parameters in order to control the injected fluid front to avoid breakthrough of the injected fluid to the production zone and thus optimize hydrocarbon recovery.

7 Claims, 4 Drawing Sheets

COMPUTER CONTROLLED INJECTION WELLS

This continuation of U.S. Ser. No. 09/462,334, filed Apr. 4, 2000.

This application claims the benefit of an earlier filing date from U.S. Ser. No. 60/052,042, filed Jul. 9, 1997, the entire contents of which is incorporated herein by reference.

BACKGROUND OF THE INVENTION

1. Field of the Invention

The invention is related to enhanced oil production. More particularly, the invention relates to a method and apparatus for controlling injection wells to optimize production from associated production wells.

2. Prior Art

Injection wells have, of course, been employed for many years in order to flush residual oil in a formation toward a production well and increase yield from the area. A common injection scenario is to pump steam down an injection well and into the formation which functions both to heat the oil in the formation and force its movement through the practice of steam flooding. In some cases, heating is not necessary as the residual oil is in a flowable form, however in some situations the oil is in such a viscous form that it requires heating in order to flow. Thus, by using steam one accomplishes both objectives of the injection well: 1) to force residual oil toward the production well and 2) to heat any highly viscous oil deposits in order mobilize such oil to flow ahead of the flood front toward the production well.

As is well known to the art, one of the most common drawbacks of employing the method above noted with respect to injection wells is an occurrence commonly identified as "breakthrough". Breakthrough occurs when a portion of the flood front reaches the production well. As happens the flood water remaining in the reservoir will generally tend to travel the path of least resistance and will follow the breakthrough channel to the production well. At this point, movement of the viscous oil ends. Precisely when and where the breakthrough will occur depends upon water/oil mobility ratio, the lithology, the porosity and permeability of the formation as well as the depth thereof. Moreover, other geologic conditions such as faults and unconformities also affect the in-situ sweep efficiency.

While careful examination of the formation by skilled geologists can yield a reasonable understanding of the characteristics thereof and therefore deduce a plausible scenario of the way the flood front will move, it has not heretofore been known to monitor precisely the location of the flood front as a whole or as individual sections thereof. By so monitoring the flood front, it is possible to direct greater or lesser flow to different areas in the reservoir, as desired, by adjustment of the volume and location of both injection and production, hence controlling overall sweep efficiency. By careful control of the flood front, it can be maintained in a controlled, non fingered profile. By avoiding premature breakthrough the flooding operation is effective for more of the total formation volume, and thus efficiency in the production of oil is improved.

SUMMARY OF THE INVENTION

The above-discussed and other drawbacks and deficiencies of the prior art are overcome or alleviated by the electronically controlled injection well system of the invention.

The invention provides significantly more information to well operators thus enhancing oil recovery to a degree not heretofore known. This is accomplished by providing real time information about the formation itself and the flood front as well as the produced fluid by providing permanent downhole sensors capable of sensing changes in the swept and unswept formation and/or the progression of the flood front and/or changes in the produced fluid (e.g. temperature). Preferably, a plurality of sensors would be employed to provide information about discrete portions of strata surrounding the injection well. This provides a more detailed data set regarding the well(s) and surrounding conditions. The sensors are, preferably, connected to a processor either downhole or at the surface for processing of information. Moreover, in a preferred embodiment the sensors are connected to computer processors which are also connected to sensors in a production well (which are similar to those disclosed in U.S. Pat. No. 5,597,042 which is fully incorporated herein by reference) to allow the production well to "talk" directly to the related injection well(s) to provide an extremely efficient real time automatic operation. Sensors employed will be to sense temperature, pressure, flow rate, electrical and acoustic conductivity, density, strain and to detect various light transmission and reflection phenomena. All of these sensor types are available commercially in various ranges and sensitivities which are selectable by one of ordinary skill in the art depending upon particular conditions known to exist in a particular well operation. Specific pressure measurements will also include pressure(s) at the exit valve(s) down the injection well or injection zone in a single well and at the pump which may be located downhole or at the surface. Measuring said pressure at key locations such as at the outlet, upstream of the valve(s) near the pump, etc., will provide information about the speed, volume, direction, etc. at/in which the waterflood front (or other fluid) is moving. Large differences in the pressure from higher to lower over a short period of time could indicate a breakthrough. Conversely, pressure from lower to higher over short periods of time could indicate that the flood front had hit a barrier. Similarly, a rapid temperature rise in the produced fluid in one zone of the production well can indicate imminent breakthrough. These conditions are, of course, familiar to one of skill in the art but heretofore far less would have been known since no workable system for measuring the parameters existed. Therefore, the present invention, since it increases knowledge, and automation, it increases productivity.

Referring now to the measurement of density as noted above, the present invention uses fluid densities to monitor the flood front from the trailing end. As will be appreciated from the detailed discussion herein, the interface between the flood front and the hydrocarbon fluid provides an acoustic barrier upon which a signal can be bounced. Thus, by generating acoustic signals and mapping the reflection, the profile of the front is generated in 4D i.e., three dimensions over time.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE PREFERRED EMBODIMENTS

Figure 1:
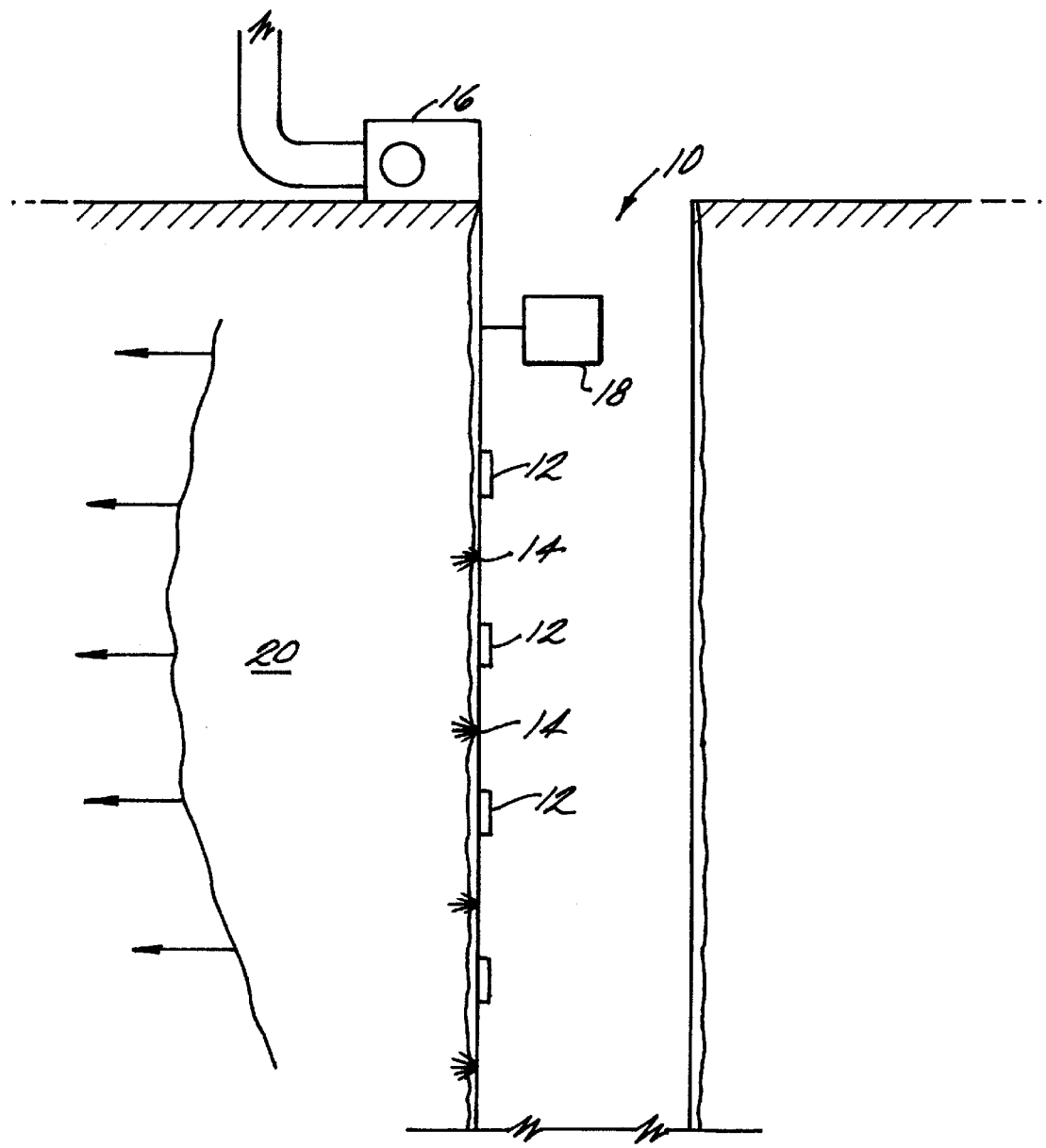
FIG. 1 is a schematic representation of an injection well illustrating a plurality of sensors mounted therein.

Referring to FIG. 1, one of ordinary skill in the art will appreciate a schematic representation of an injection well 10. Also recognizable will be the representation of a flood front 20 which emanates from the injection well and is intended to progress toward a production well. This is additionally well represented in FIG. 2 of the present application. In the present invention at least one and, preferably, a plurality of sensors 12 are located permanently installed in the injection well and which are connected via the electrical wire cabling or fiber optic cabling to a processor which may either be a permanent downhole processor or a surface processor. The system provides immediate real time information regarding the condition of the fluid front having been injected into the formation by the injection well or injection zone. By carefully monitoring parameters such as conductivity, fluid density, pressure at the injection ports 14 or at the pump 16 (which while represented at the surface can be positioned downhole as well), acoustics and fluorescence for biological activity, one can ascertain significant information about the progress of the flood front such as whether the front has hit a barrier or whether the front may have "fingered" resulting in a likely premature breakthrough. This information is extremely valuable to the operator and processor in order to allow remedial measures to occur to prevent occurrences that would be detrimental to the efficiency of the flooding operation. Remedial actions include the opening or closing of chokes or other valves in increments or completely in order to slow down particular areas of injection or increase the speed of particular areas of injection in order to provide the most uniform flood front based upon the sensed parameters. These remedial measures can be taken either by personnel at the surface directing such activity or preferably automatically upon command by the surface controller/processor on downhole processing unit 18. The sensors contemplated herein may be in the injection well or in both the injection well and the production well. They are employed in several different methods to obtain information such as that indicated above.

Control is further heightened in the invention by providing a link between downhole sensors in the production well to the downhole sensors in the injection well as well as a connection to the flow control tools in both wells. By providing the operable connections to all of these parts of the system, the well can actually run itself and provide the most efficient oil recovery based upon the creation and maintenance of a uniform flood front. It will be understandable at this point to one of ordinary skill in the art that the flood front can be regulated from both sides of FIG. 2, i.e., the injection well and the production well, by opening production well valves in areas where the flood front is lagging while closing valves in areas where the flood front is advancing. Complementarily to this, the fluid injection valves e.g., sliding or rotating sleeves, etc. would be choked or closed where the flood front is advancing quickly and opened more where the flood front is advancing slowly. This seemingly complex set of circumstances is easily controlled by the system of the invention and rapidly remedies any abnormalities in the intended flood profile thus avoiding breakthrough of the injected fluid to the production well. Sweep efficiency of the steam or other fluid front is greatly enhanced by the system of the invention. All of the sensors contemplated in the production well and the injection well are, preferably, permanently installed downhole sensors which are connected to processors and/to one another by electrical cabling or fiber optic cabling.

Figure 3:
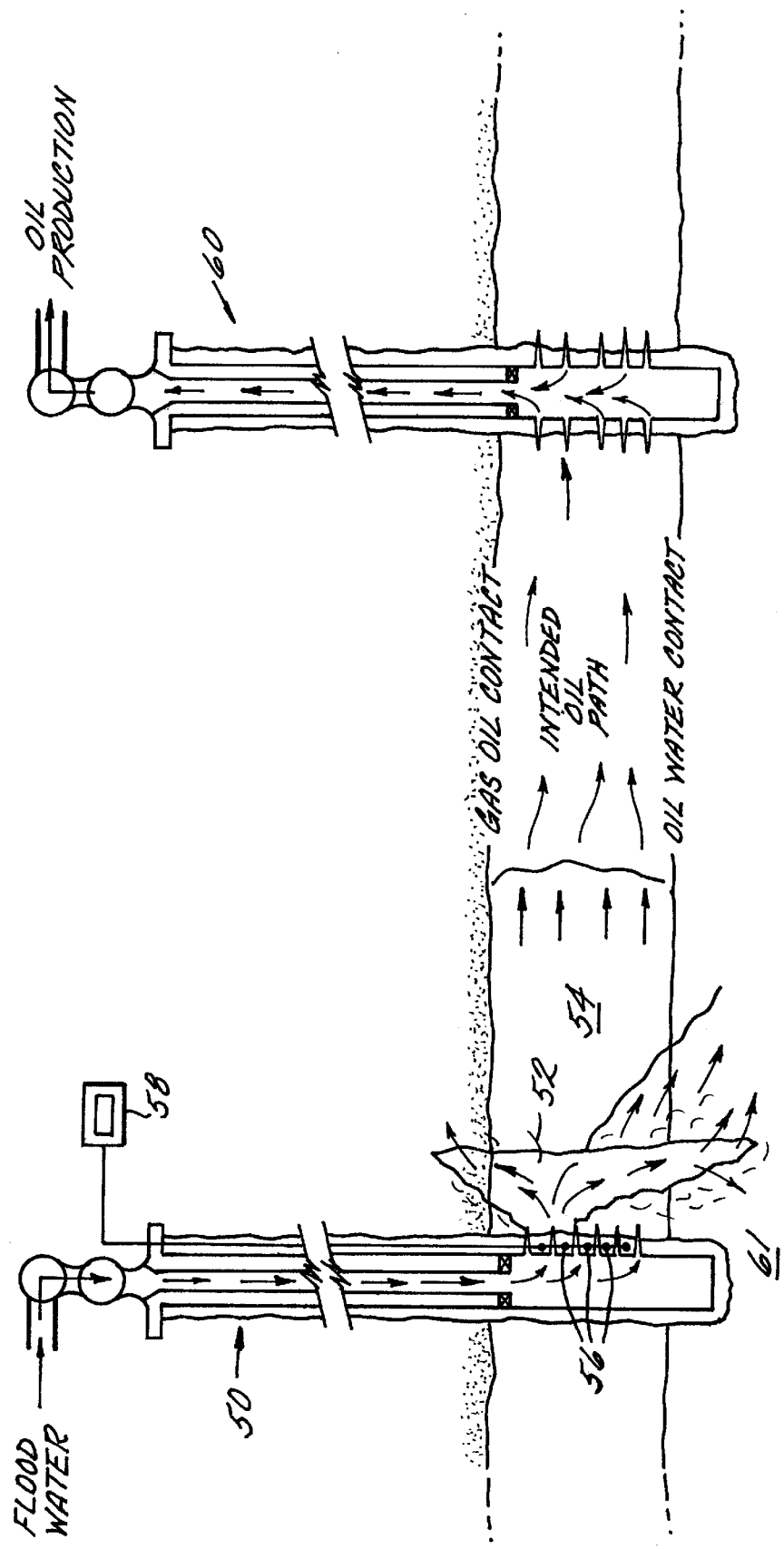
FIG. 3 is a schematic representation similar to FIG. 2 but illustrating fluid loss through unintended fracturing.

In another embodiment of the invention, illustrated schematically in FIG. 3, downhole sensors measure strain induced in the formation by the injected fluid. Strain is an important parameter for avoiding exceeding the formation parting pressure or fracture pressure with the injected fluid. By avoiding the opening of or widening of natural pre-existing fractures large unswept areas of the reservoir can be avoided. The reason this information is important in the regulation of pressure of the fluid to avoid such activity is that when pressure opens fractures or new fractures are created there is a path of much less resistance for the injected fluid to run through. Thus, as stated above, since the injection fluid will follow the path of least resistance, it would generally run in the fractures and around areas of the reservoir that need to be swept. Clearly, this substantially reduces the sweep efficiency of the injected fluid. The situation is generally referred to in the art as an "artificially high permeability channel." Another detriment to such a condition is the uncontrolled loss of injected fluids. This is clearly a loss of oil due to the reduced efficiency of the sweep and additionally may function as an economic drain due to the loss of expensive injection fluids.

FIG. 3 schematically illustrates the embodiment and the condition set forth above by illustrating an injection well 50 and a production well 60. Fluid 52 is illustrated escaping via the unintended fracture from the formation 54 into the overlying gas cap level 56 and the underlying water table 61 and it is evident to one of ordinary skill in the art that the fluid is being lost in this location. The condition is avoided by the invention by using pressure sensors to limit the injection fluid pressure as described above. The rest of the fluid 52 is progressing as it is intended to through the formation 54. In order to easily and reliably determine what the stress is in the formation 54, acoustic sensors 56 are located in the injection well 50 at various points therein. Acoustic sensors which are well suited to the task to which they will be put in the present invention are commercially available from Systems Innovations, Inc., Spectris Corporation and Falmouth Scientific, Inc. The acoustic sensors pick up sounds generated by stress in the formation which propagate through the reservoir fluids or reservoir matrix to the injection well. In general, higher sound levels would indicate severe stress in the formation and should generate a reduction in pressure of the injected fluid whether by automatic control or by technician control. A data acquisition system 58 is preferable to render the system extremely reliable and system 58 may be at the surface where it is illustrated in the schematic drawing or may be downhole. Based upon acoustic signals received, the system of the invention, preferably automatically (although manually is workable), reduces pressure of the injected fluid by reducing pump pressure. Maximum sweep efficiency is, thus, obtained.

Figure 4:
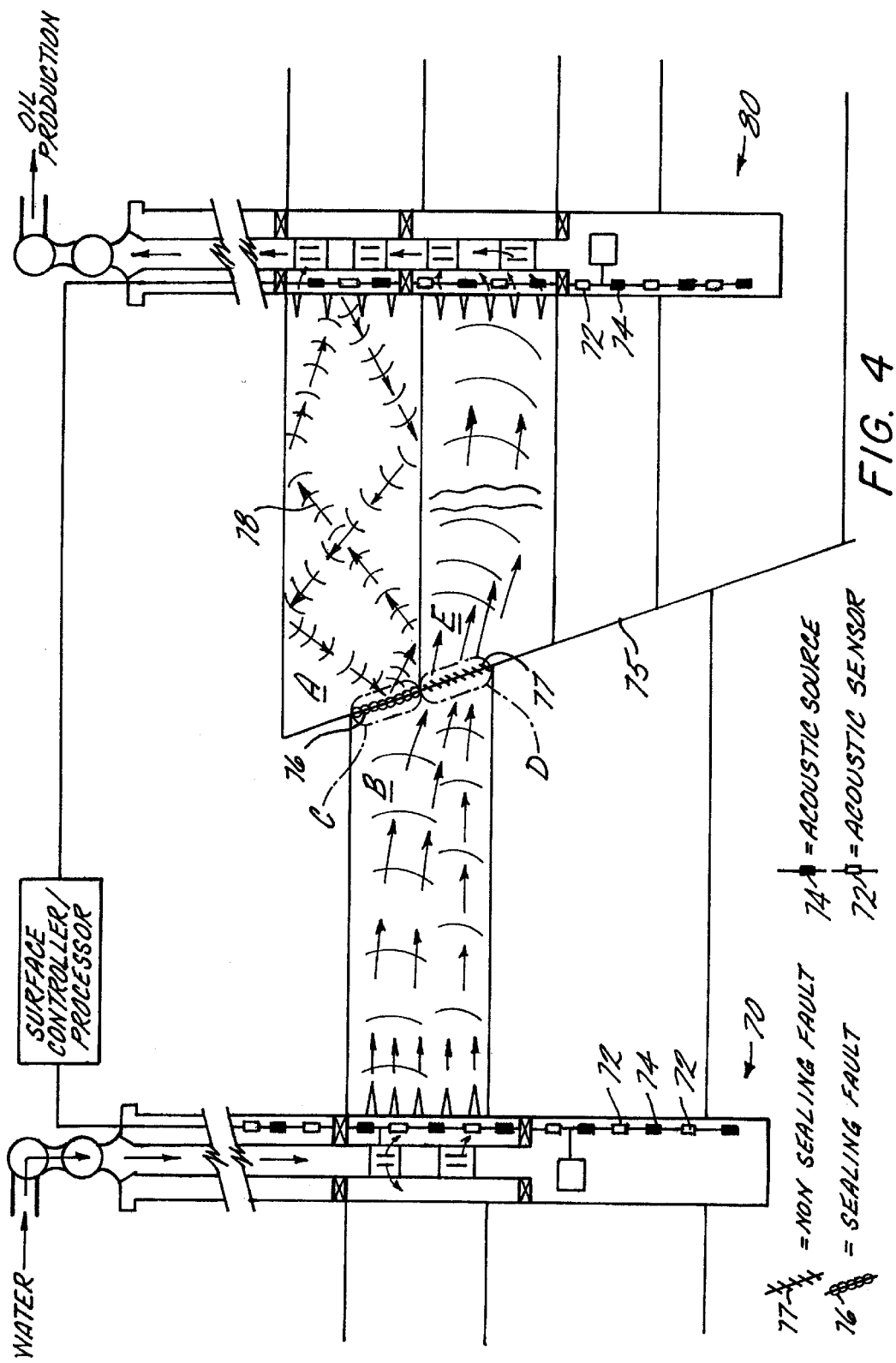
FIG. 4 is a schematic representation of an injection production well system where the wells are located on either side of a fault.

In yet another embodiment of the invention, as schematically illustrated in FIG. 4, acoustic generators and receivers are employed to determine whether a formation which is bifurcated by a fault is sealed along the fault or is permeable along the fault. It is known by one of ordinary skill in the art that different strata within a formation bifurcated by a fault may have some zones that flow and some zones that are sealed; this is the illustration of FIG. 4. Referring directly to FIG. 4, injection well 70 employs a plurality of sensors 72 and acoustic generators 74 which, most preferably, alternate with increasing depth in the wellbore. In production well 80, a similar arrangement of sensors 72 and acoustic generators 74 are positioned. The sensors and generators are preferably connected to processors which are either downhole or on the surface and preferably also connect to the associated production or injection well. The sensors 72 can receive acoustic signals that are naturally generated in the formation, generated by virtue of the fluid flowing through the formation from the injection well and to the production well and also can receive signals which are generated by signal generators 74. Where signal generators 74 generate signals, the reflected signals that are received by sensors 72 over a period of time can indicate the distance and acoustic volume through which the acoustic signals have traveled. This is illustrated in area A of FIG. 4 in that the fault line 75 is sealed between area A and area B on the figure. This is illustrated for purposes of clarity only by providing circles 76 along fault line 75. Incidentally, the areas of fault line 75 which are permeable are indicated by hash marks 77 through fault line 75. Since the acoustic signal represented by arrows and semi-curves and indicated by numeral 78 cannot propagate through the area C of the drawing which bifurcates area A from area B on the left side of the drawing, that signal will bounce and it then can be picked up by sensor 72. The time delay, number and intensity of reflections and mathematical interpretation which is common in the art provides an indication of the lack of pressure transmissivity between those two zones. Additionally this pressure transmissivity can be confirmed by the detection by said acoustic signals by sensors 72 in the production well 80. In the drawing the area directly beneath area A is indicated as area E is permeable to area B through fault 75 because the region D in that area is permeable and will allow flow of the flood front from the injection well 70 through fault line 75 to the production well 80. Acoustic sensors and generators can be employed here as well since the acoustic signal will travel through the area D and, therefore, reflection intensity to the receivers 72 will decrease. Time delay will increase. Since the sensors and generators are connected to a central processing unit and to one another it is a simple operation to determine that the signal, in fact, traveled from one well to the other and indicates permeability throughout a particular zone. By processing the information that the acoustic generators and sensors can provide the injection and production wells can run automatically by determining where fluids can flow and thus opening and closing valves at relevant locations on the injection well and production well in order to flush production fluid in a direction advantageous to run through a zone of permeability along the fault.

Other information can also be generated by this alternate system of the invention since the sensors 72 are clearly capable of receiving not only the generated acoustic signals but naturally occurring acoustic waveforms arising from both the flow of the injected fluids as the injection well and from those arising within the reservoirs in result of both fluid injection operations and simultaneous drainage of the reservoir in resulting production operations. The preferred permanent deployment status of the sensors and generators of the invention permit and see to the measurements simultaneously with ongoing injection flooding and production operations. Advancements in both acoustic measurement capabilities and signal processing while operating the flooding of the reservoir represents a significant, technological advance in that the prior art requires cessation of the injection/production operations in order to monitor acoustic parameters downhole. As one of ordinary skill in the art will recognize the cessation of injection results in natural redistribution of the active flood profile due primarily to gravity segregation of fluids and entropic phenomena that are not present during active flooding operations. This clearly also enhances the possibility of premature breakthrough, as oil migrates to the relative top of the formation and the injected fluid, usually water, migrates to the relative bottom of the formation, there is a significant possibility that the water will actually reach the production well and thus further pumping of steam or water will merely run underneath the layer of oil at the top of the formation and the sweep of that region would be extremely difficult thereafter.

In yet another embodiment of the invention fiber optics are employed (similar to those disclosed in U.S. application Ser. No. 60/048,989, filed on Jun. 9, 1997 entitled CHEMICAL INJECTION WELL CONTROL AND MONITORING SYSTEM now U.S. Ser. No. 09/082,246 filed May 20, 1998, respectively all of which are fully incorporated herein by reference) to determine the amount of and/or presence of biofouling within the reservoir by providing a culture chamber within the injection or production well, wherein light of a predetermined wavelength may be injected by a fiber optical cable, irradiating a sample determining the degree to which biofouling may have occurred. As one of ordinary skill in the art will recognize, various biofouling organisms will have the ability to fluoresce at a given wavelength, that wavelength once determined, is useful for the purpose above stated.

Figure 2:
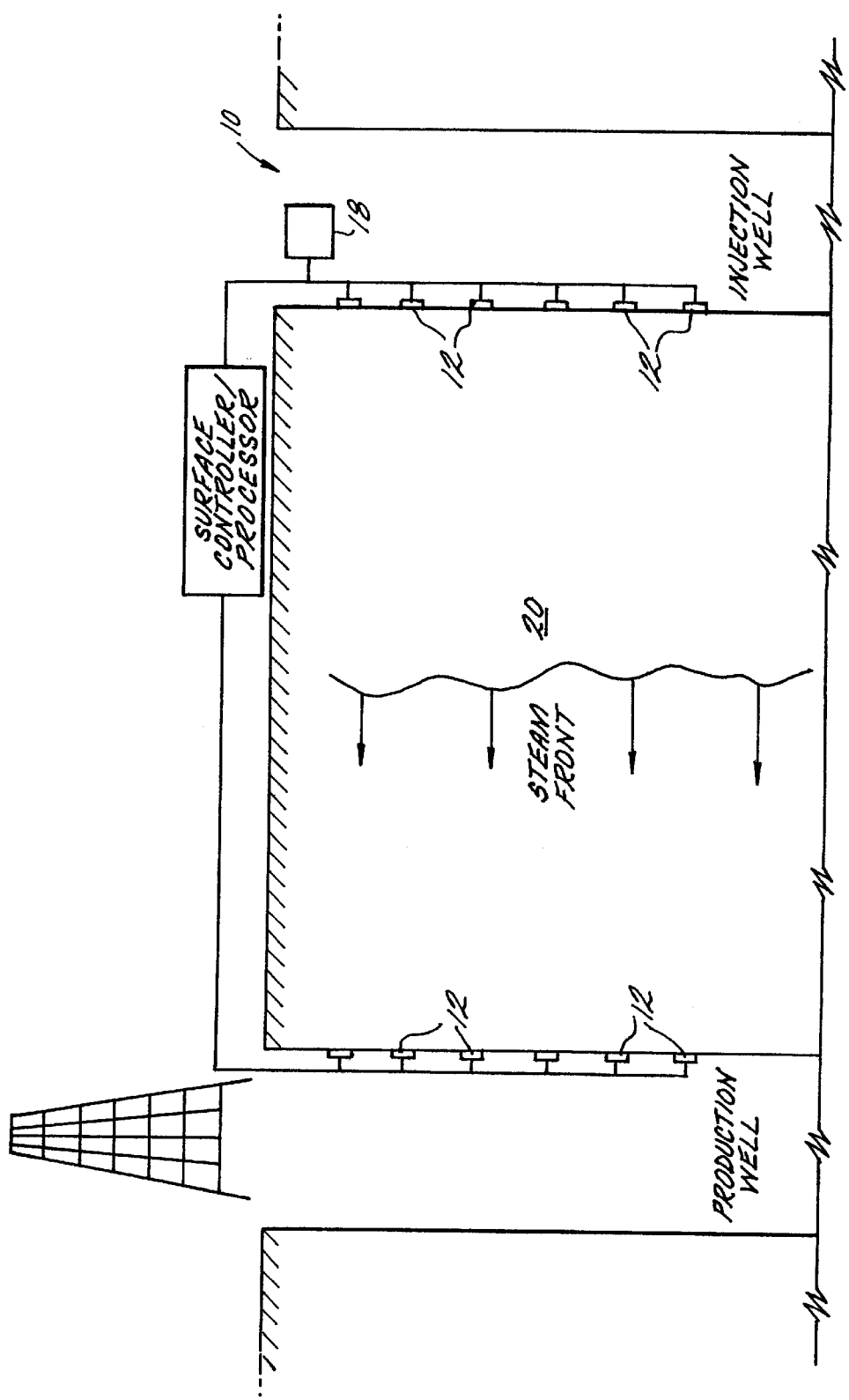
FIG. 2 is a schematic representation illustrating both an injection well and a production well having sensors and a flood front running between the wells.

In another embodiment of the invention, the flood front is monitored from the "back" employing sensors installed in the injection well. The sensors which are adequately illustrated in FIGS. 1 and 2 provide acoustic signals which reflect from the water/oil interface thus providing an accurate picture in a moment in time of the three-dimensional flood front. Taking pictures in 4-D i.e., three dimensions over real time provides an accurate format of the density profile of the formation due to the advancing flood front. Thus, a particular profile and the relative advancement of the front can be accurately determined by the density profile changes. It is certainly possible to limit the sensors and acoustic generators to the injection well for such a system, however it is even more preferable to also introduce sensors and acoustic generators in the production well toward which the front is moving thus allowing an immediate double check of the fluid front profile. That is, acoustic generators on the production well will reflect a signal off the oil/water interface and will provide an equally accurate three-dimensional fluid front indicator. The indicators from both sides of the front should agree and thus provides an extremely reliable indication of location and profile.

Although the drawings herein illustrate independent injection and production wells the invention is also directed to a single wellbore having at least a production zone and an injection zone. This may occur in a single primary bore or may occur in a multilateral well where the injection zone is in one of the laterals and the production zone in another of the laterals. An example of this latter type system is where a lateral and generally horizontal bore is above a formation and another is below the formation and where injected steam is employed to heat very viscous oil in the formation allowing it to gravity feed to the production zone thereunder.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of enhancing target fluid recovery in a formation having a fault comprising:
   generating acoustic signals;
   receiving reflected signals;
   determining distance and acoustic volume through which the acoustic signals have traveled; and calculating a location and condition of said fault.

2. A method of enhancing target fluid recovery in a formation as claimed in claim 1 wherein said receiving further includes receiving naturally generated acoustic signals.

3. A method of enhancing target fluid recovery in a formation as claimed in wherein claim 1 said enhancing includes adjusting an injection well injection profile in accordance with the location and condition of said fault.

4. An enhanced recovery hydrocarbon well system comprising:
   at least one injection well;
   at least one production well;
   at least one acoustic generator in each of said injection well and said production well;
   at least one acoustic receiver in each of said injection well and said production well;
   a controller system in communication with said at least one generator in said injection well and said production well and with said at least one receiver in said injection well and said production well, said controller having the ability to determine distance and acoustic volume through which acoustic signals have traveled to determine location and condition of a fault in a formation.

5. An enhanced recovery hydrocarbon well system as claimed in claim 4 wherein said at least one acoustic generator and said at least one acoustic receiver are configured to detect a fault in a reservoir.

6. An enhanced recovery hydrocarbon well system as claimed in claim 4 wherein said at least one acoustic receiver and said at least one acoustic generator are alternated with increasing depth.

7. An enhanced recovery hydrocarbon well system as claimed in claim 4 wherein said at least one acoustic receiver is configured to receive naturally occurring acoustic waves.

\* \* \* \* \*